United States Patent
Donovan

(10) Patent No.: US 10,237,537 B2
(45) Date of Patent: Mar. 19, 2019

(54) SYSTEM AND METHOD FOR CREATING AN INTERACTIVE VIRTUAL REALITY (VR) MOVIE HAVING LIVE ACTION ELEMENTS

(71) Applicant: ALEXANDER SEXTUS LIMITED, Halifax (CA)

(72) Inventor: Paul Donovan, Halifax (CA)

(73) Assignee: ALEXANDER SEXTUS LIMITED, Halifax, Nova Scotia ( * ) Notice: Subject to any disclaimer, the term of this patent is extended or adjusted under 35 U.S.C. 154(b) by 258 days.

(21) Appl. No.: 15/407,420

(22) Filed: Jan. 17, 2017

(65) Prior Publication Data
US 2018/0205940 A1    Jul. 19, 2018

(51) Int. Cl.
*H04N 13/282* (2018.01)
*H04N 13/189* (2018.01)
*H04N 13/243* (2018.01)
*H04N 13/344* (2018.01)

(52) U.S. Cl.
CPC ......... *H04N 13/282* (2018.05); *H04N 13/189* (2018.05); *H04N 13/243* (2018.05); *H04N 13/344* (2018.05)

(58) Field of Classification Search
CPC .................................................... H04N 13/282
See application file for complete search history.

(56) References Cited

U.S. PATENT DOCUMENTS

| | | |
|---|---|---|
| 2002/0158873 A1 | 10/2002 | Williamson |
| 2008/0048848 A1 | 2/2008 | Kawakami |
| 2009/0174771 A1 | 7/2009 | Royz et al. |
| 2011/0181601 A1 | 7/2011 | Mumbauer et al. |
| 2013/0071012 A1* | 3/2013 | Leichsenring ........... G06K 9/80 382/154 |
| 2014/0118357 A1 | 5/2014 | Covington |

(Continued)

FOREIGN PATENT DOCUMENTS

| | | |
|---|---|---|
| WO | 20150085406 A1 | 6/2015 |
| WO | 20160079472 A1 | 5/2016 |

OTHER PUBLICATIONS

Steve Pak, "Google to Introduce Pixel Smartphones, Google Home, and Daydream Vr Headset at October Event: Report", Source: http://en.yibada.com/articles/156592/20160903/google-introduce-pixel-smartphones-home-daydream-vr-headset-october-event.htm, Sep. 3, 2016, pp. 1-6.

(Continued)

*Primary Examiner* — James M Pontius

(57) ABSTRACT

Methods and systems are disclosed for creating a virtual reality (VR) movie having at least one live action element. A live action element is an element that is not computer-generated, but is instead filmed (e.g. the filmed performance of a real human actor). The VR movie may be interactive in that small movements of the viewer's head, when viewing the live action elements, may result in different visual points-of-view that match the point-of-view changes expected by the viewer. In one embodiment, at least one live action element is filmed using at least two cameras to obtain a stereoscopic video recording. A stereoscopic digital still image of the background is also obtained separate from the live action elements. The stereoscopic video recording and the stereoscopic digital still image of the background are stored in memory, as separate files, for later compositing in a home device.

14 Claims, 8 Drawing Sheets

(56) References Cited

U.S. PATENT DOCUMENTS

| | | |
|---|---|---|
| 2014/0375531 A1 | 12/2014 | Latypov et al. |
| 2016/0086379 A1 | 3/2016 | Sadi et al. |
| 2016/0335808 A1 | 11/2016 | Novak |
| 2018/0253894 A1* | 9/2018 | Krishnan ................ G06T 15/08 |

OTHER PUBLICATIONS

Gavin Costello, "Capturing Stereoscopic 360 Screenshots and Movies From Unreal Engine 4", Source: https://www.unrealengine.com/blog/capturing-stereoscopic-360-screenshots-videos-movies-unreal-engine-4, May 10, 2016, pp. 1-25.

* cited by examiner

US 10,237,537 B2

SYSTEM AND METHOD FOR CREATING AN INTERACTIVE VIRTUAL REALITY (VR) MOVIE HAVING LIVE ACTION ELEMENTS

FIELD

The present application relates to virtual reality movies.

BACKGROUND

Virtual reality (VR) is the simulation of a three-dimensional environment that can be viewed in a seemingly real or physical way by a person. A VR movie is a movie that is viewed in VR.

A VR movie is viewed wearing a headset. When the viewer's head is in its normal position, the viewer sees the actors and the background scene immediately surrounding the actors. However, the viewer has the ability to move his or her head to see other things, such as the scene to the left and right of the viewer.

SUMMARY

Methods and systems are disclosed for creating a VR movie having at least one live action element. A live action element is an element in the VR movie that is not computer-generated, but is instead filmed. As one example, a live action element may be the filmed performance of a real human actor. In some embodiments, the VR movie is interactive in that small movements of the viewer's head, when viewing the live action elements, result in different visual points-of-view that match the point-of-view changes expected by the viewer.

Using the methods and systems disclosed herein, the VR movie may have a reduced file size compared to some existing systems, while avoiding or reducing the need for compression techniques that may degrade picture quality. The VR movie may also be more interactive than some existing VR systems, possibly resulting in a more immersive viewing experience.

In one embodiment, there is provided a method for obtaining a VR movie. The method includes filming at least one live action element using at least two cameras to obtain a stereoscopic video recording. The method further includes obtaining a stereoscopic digital still image of the background separate from the live action element(s). The method further includes storing in memory, as separate files, the stereoscopic video recording and the stereoscopic digital still image of the background, for later compositing in a home device.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
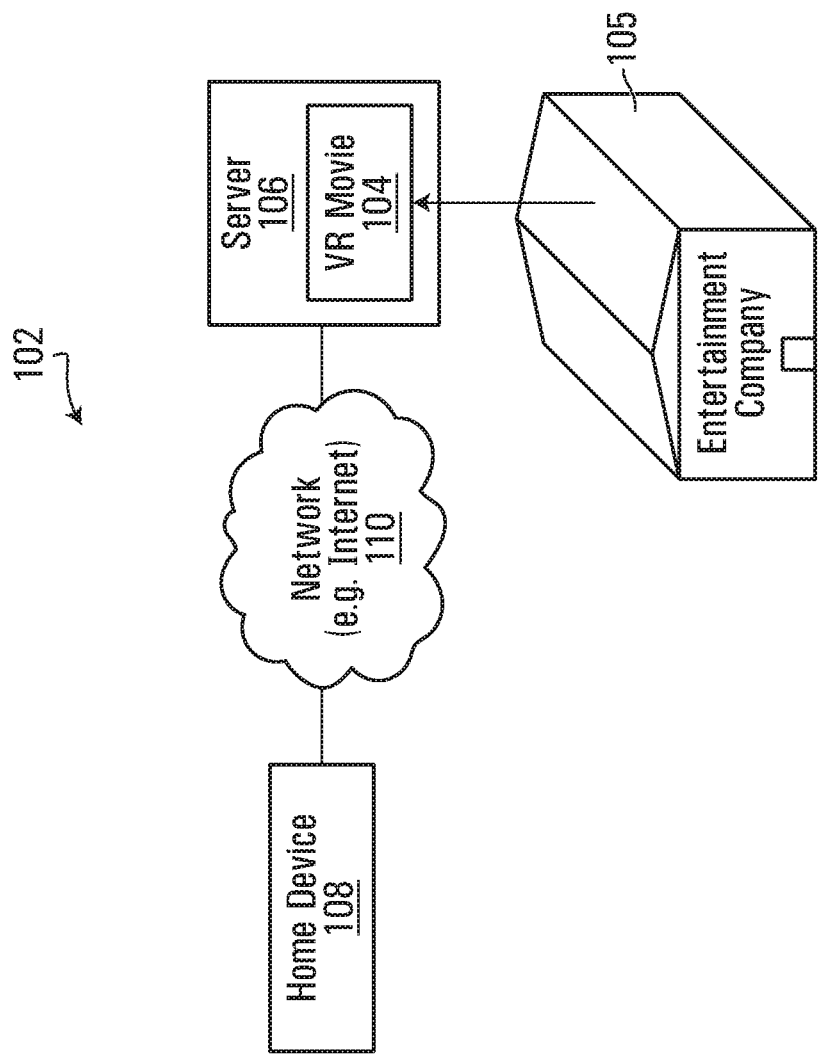
FIG. 1 is a block diagram of an example system for obtaining and viewing a VR movie.
Figure 1:
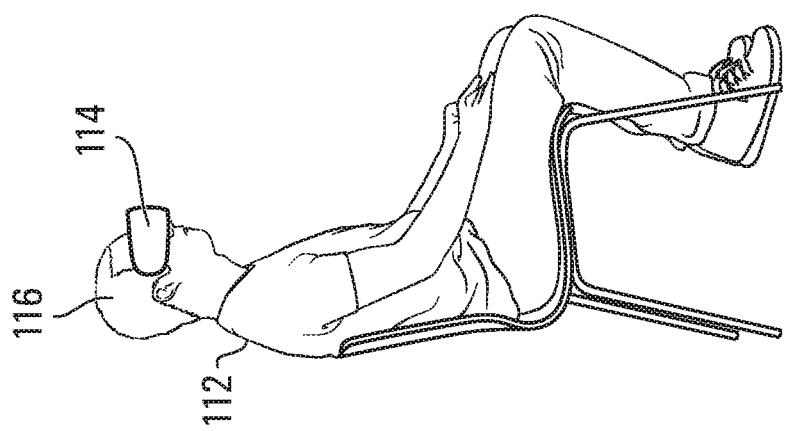

FIG. 1 is a block diagram of an example system 102 for obtaining and viewing a VR movie 104. The VR movie 104 is produced by an entertainment company 105, and then digitally stored in memory, e.g. on a server 106. A home device 108 is coupled to the server 106 via a network 110. The network 110 may be the Internet. When a viewer 112 desires to watch the VR movie 104, the VR movie 104 may be downloaded or streamed onto the home device 108 over the network 110. The viewer 112 wears a headset 114 to view the VR movie 104. The headset 114 is secured to the head 116 of the viewer 112. During viewing, the headset 114 uses motion sensors (not illustrated) to obtain positional information indicative of the position of the viewer's head 116. The positional information is transmitted to the home device 108, e.g. using a cable or a wireless connection. The home device 108 obtains the stereoscopic (three dimensional) view to present to the viewer 112 based on the position of the viewer's head 116. The home device 108 then transmits the stereoscopic view back to the headset 114. The stereoscopic view is presented to the viewer 112 on the headset 114. This process is repeated in real time, e.g. on a frame-by-frame basis for the VR movie 104.

Figure 2:
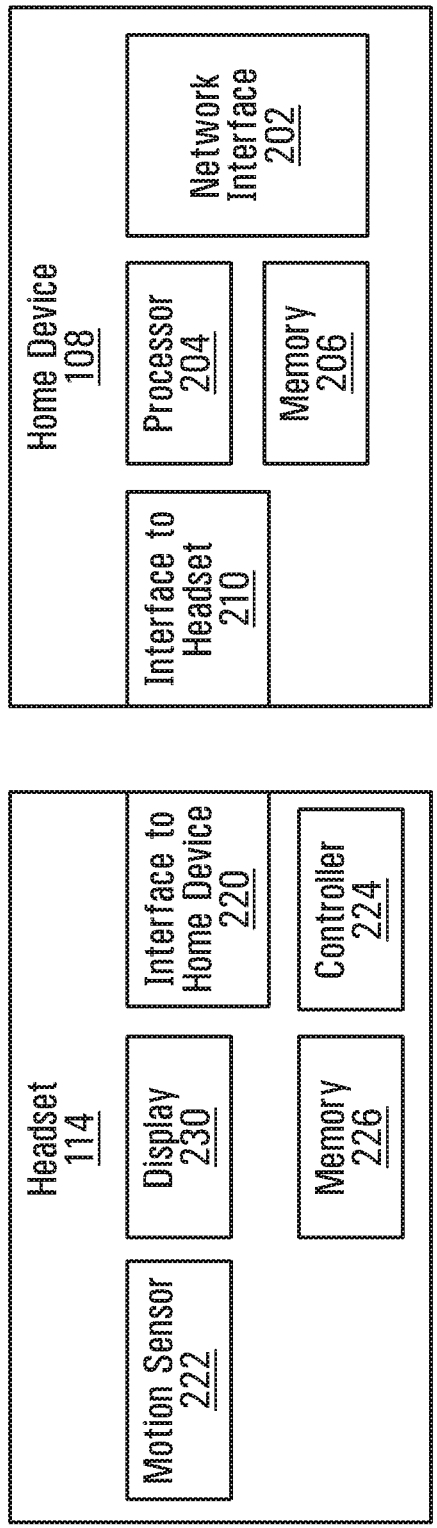
FIG. 2 illustrates a home device and headset in more detail, according to one embodiment.

FIG. 2 illustrates the home device 108 and headset 114 in more detail. The home device 108 includes a network interface 202 to communicate with the network 110, e.g. to access the server 106 in order to download the VR movie 104. The home device 108 further includes a processor 204 for performing the operations of the home device 108, e.g. the processor 204 obtains the stereoscopic images of the VR movie 104 based on the position of the viewer's head 116, and the processor 204 controls the home device 108 to transmit the stereoscopic images to the headset 114. The processor 204 may be a graphics processor. The home device 108 further includes a memory 206 for storing any information used by the processor 204, e.g. the memory 206 stores the VR movie 104 downloaded from the server 106. The home device 108 further includes an interface 210 for communicating with the headset 114.

The headset 114 includes a complementary interface 220 for communicating with the home device 108. The headset 114 further includes at least one motion sensor 222 for obtaining positional information indicative of the position of the viewer's head 116. The headset 114 further includes a controller 224 for controlling the operations of the headset 114, e.g. reading the motion sensor 222, instructing communication with the home device 108, and instructing display of received stereoscopic images. The headset 114 further includes a memory 226 for storing any information used by the headset 114, e.g. the memory 226 stores the positional information read by the motion sensor 222, as well as the received stereoscopic images to be displayed.

The home device 108 further includes a display 230 for displaying the stereoscopic images received from the home device 108.

FIGS. 1 and 2 illustrate the headset 114 as physically separated from the home device 108. Alternatively, the home device 108 and the headset 114 may be physically connected to each other, and/or may be part of the same unit, e.g. the headset 114 and the home device 108 may be the same device. As one example, a mobile phone may be attached to the viewer's head 116. The mobile phone may act as both the home device 108 and the screen of the headset 114. The mobile phone may download the VR movie 104 and then display the stereoscopic images on the screen of the mobile phone based on the position of the viewer's head 116.

Returning to FIG. 1, one way for the entertainment company 105 to create the VR movie 104 is as follows. Several cameras may be mounted around the surface of a sphere (not shown) to be able to film in 360 degrees and thereby generate 360 degree spherical frames. Each camera mounted on the sphere is actually two cameras: one filming for the right eye and one filming for the left eye to create a stereoscopic image. The result is a VR movie 104 comprising a pre-recorded stream of 360 degree spherical still images, similar (except in file size) to a traditional 24 frame-per-second celluloid movie that is to play back in a linear series from a computer memory. The VR movie 104 is downloaded onto the home device 108. When the viewer 112 is watching the VR movie 104, the home device 108 sends to the headset 114, in real time, the appropriate portion of the 360 degree movie based on the position/direction of the viewer's head 116. Although the whole 360 degree spherical frame is available, the viewer 112 only sees a part of the 360 degree spherical frame at any given time based on the position/direction of the viewer's head 116. The problem is that such a VR movie 104 may have a large file size due to the presence of the stream of 360 degree spherical still images. For example, a 100 minute linear VR movie may comprise around 150,000 stereoscopic panoramic images and may have a file size around one terabyte. Downloading the VR movie 104 over the network 110 may not be feasible, or may take too long. Even if the download speed of the home device 108 is of sufficient speed such that file size is not a concern, it is still undesirable to have a VR movie 104 of a large file size. File transmission size may be reduced by lessening image resolution and/or by performing compression, but image quality may be sacrificed. File transmission size may instead be reduced by not downloading the whole VR movie 104 onto the home device 108, but instead have the home device 108 send the head positional information in real time to the sever 106 via the network 110, and only receive back from the server 106 the particular segment of the 360 degree spherical environment at which the viewer 112 is looking. However, this may be limited in implementation, e.g. due to transmission delays through the network 110.

Another way for the entertainment company 105 to create the VR movie 104 is as follows. No live action elements are filmed, but instead the VR movie 104 is completely computer animated. When the home device 108 downloads the VR movie 104, what is downloaded are algorithms and 3D models for generating a computer image in real-time based on the position of the viewer's head 116. When the viewer 112 is watching the VR movie 104, the position of the viewer's head 116 is transmitted from the headset 114 to the home device 108, and the home device 108 generates the appropriate computer image. The file size of the VR movie 104 may not be as large to download over the network 110, but the limitation is that there are no real actors or other live action elements—everything is computer animated.

Systems and methods are described below for creating a VR movie 104 that has live action elements and that may have a smaller file size. By live action elements, it is meant elements that are not computer-generated, but are instead filmed, e.g. real human beings and/or real animals and/or other live action elements, such as puppets or props or set pieces that real actors may interact with.

As described in more detail below, a live action filming and compositing process is disclosed for generating a VR movie 104. An edited stream of photographed and/or recorded images of live action elements is stored as an alpha channel separately from the background scene. Instead of being composited in post-production and thereby creating a linear stream of completed frames with all picture elements "baked in", the alpha channel and background scene are instead composited by the home device in real time, along with any desired computer generated elements needed to enhance the image. Specifically, when the VR movie is downloaded, the home device 108 downloads the filmed live action elements, the background scene (which may be instructions for computer-generating the background scene), and instructions for the home device 108 to composite the filmed live action elements with the background scene, possibly along with instructions to computer generate new picture elements (e.g. subtly moving clouds) and composite these new picture elements together with the background. The home device 108 then performs the compositing in real-time as the viewer is watching the VR movie based on the position of the viewer's head.

Figure 3:
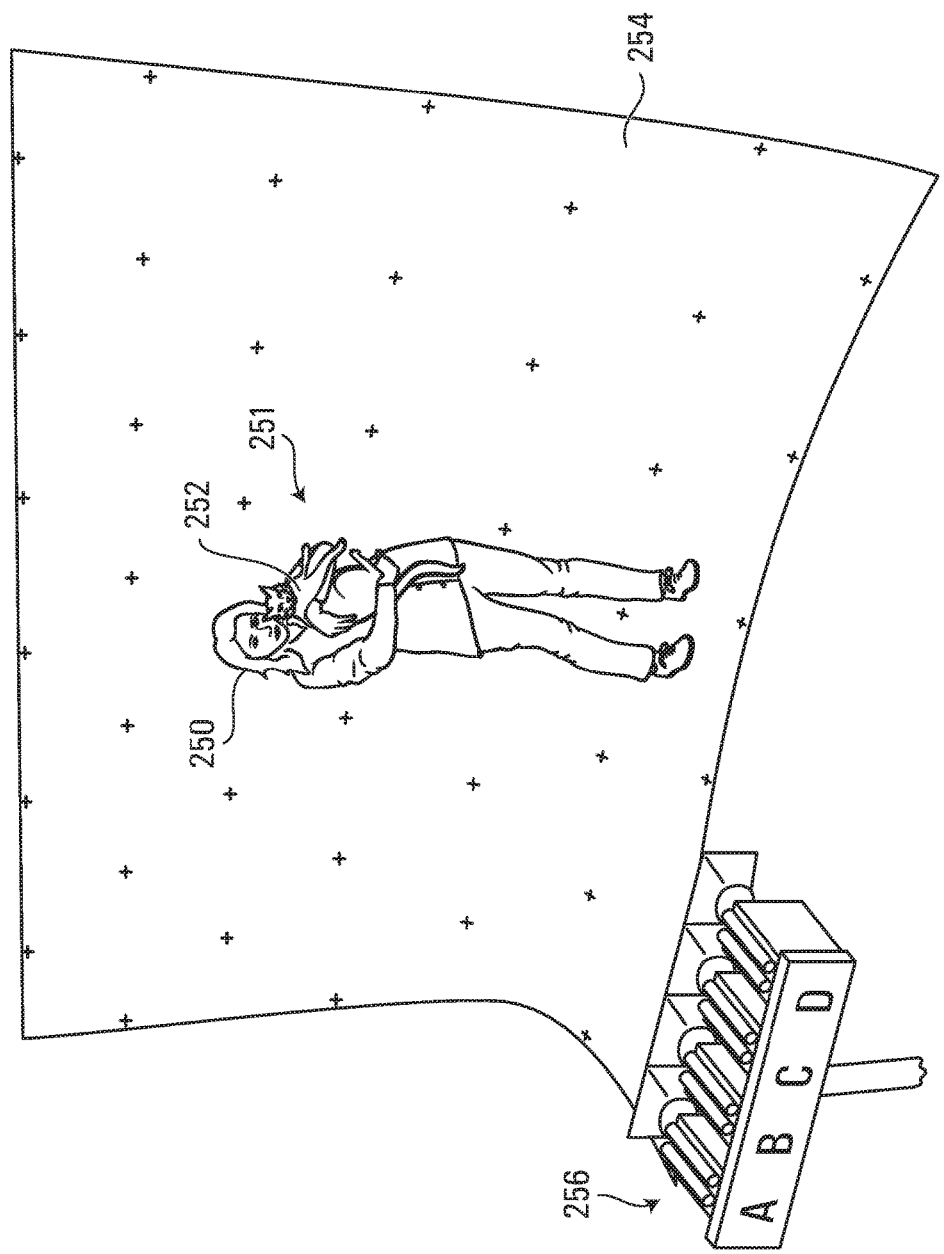
FIG. 3 illustrates the filming of live action elements in front of a screen, according to one embodiment.

In one embodiment, the VR movie 104 may be obtained as follows. Live action elements are filmed in front of a screen, such as a green screen, a red screen, or a blue screen, the choice of color depending upon the colors of the live action elements, such as an actor's costume. As an example, FIG. 3 illustrates live action elements 251 consisting of a real human being 250 and a real cat 252. The interaction between the human 250 and the cat 252 is the focus of the movie, and this interaction is filmed in front of a screen 254. In the embodiment of FIG. 3, the filming uses a rack of four cameras 256 mounted horizontally in parallel (or on a horizontal curve of a sphere), with the standard inter-pupillary distance of about 60 mm between each camera. The four cameras 256 are respectively labelled "A", "B", "C", and "D". The cameras 256 are for stereoscopic filming to have a 3D image. Only two cameras (e.g. cameras B and C) are needed to perform stereoscopic filming. However, by using more than two cameras, the home device is able to interpolate images of adjacent cameras based on small movements of the viewer's head, to match visual points-of-view that match the point-of-view changes expected by the viewer. Camera B normally corresponds to the image seen by the viewer's left eye. However, an image from Camera B interpolated with an image from either Camera A or C, depending on the viewer's head position, may correspond to the image seen by the viewer's left eye. Camera C normally corresponds to the image seen by the viewer's right eye. However, an image from Camera C interpolated with an image from either Camera B or D, depending on the viewer's head position, may correspond to the image seen by the viewer's right eye. More than four cameras may instead be used to allow for more interpolation. Also, the distance between cameras A and B, and the distance between cameras B and C may be greater than the standard inter-pupillary distance, e.g. the distance may be two times the standard inter-pupillary distance.

In FIG. 3, only real actors 250 and 252 are illustrated as being filmed in front of the screen 254. However, other live action elements may be filmed in front of the screen 254, e.g. nearby props or small set pieces that the real actors 250 and 252 may interact with.

Figure 4:
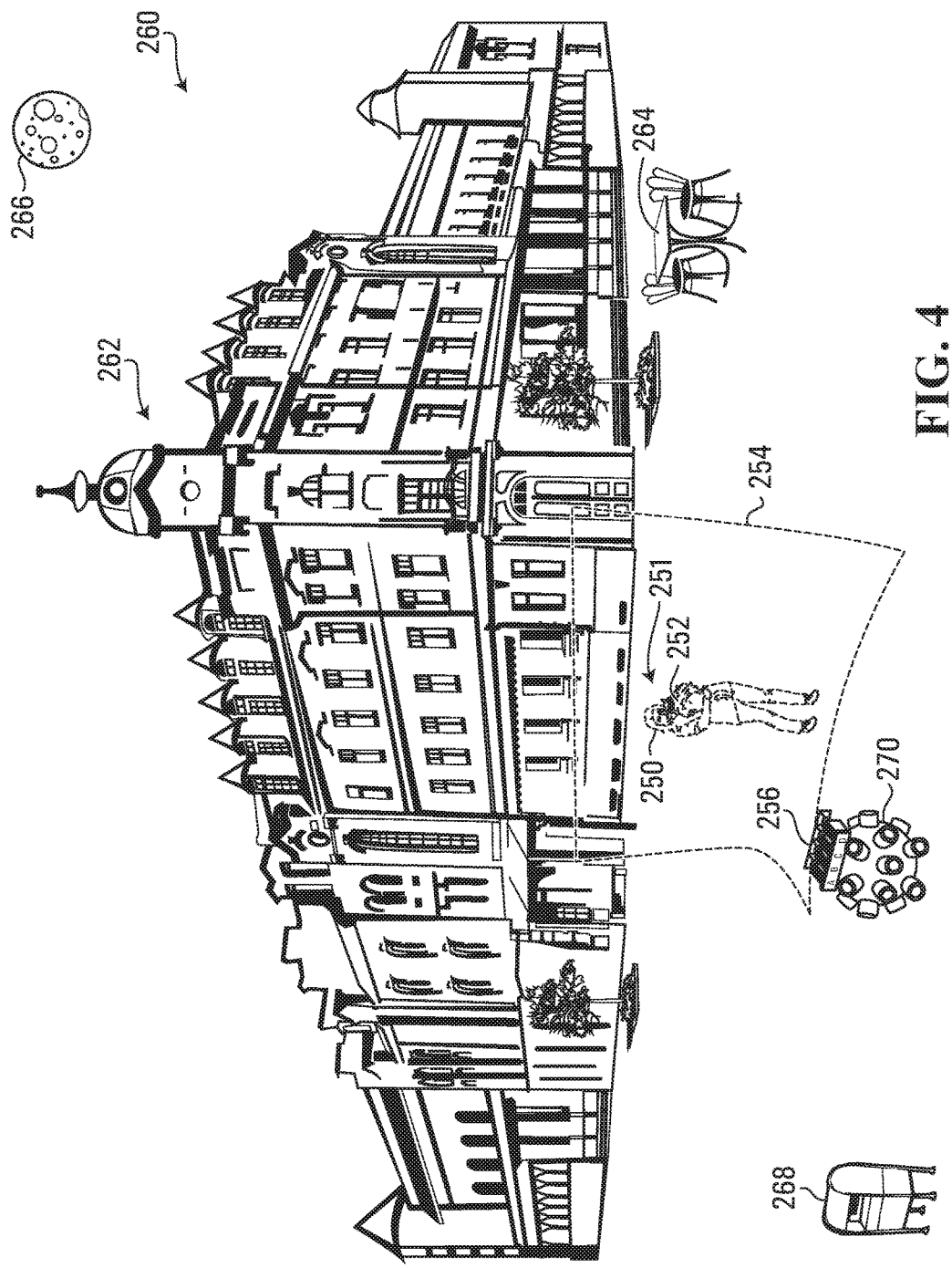
FIG. 4 illustrates a background set within which live action elements will be superimposed, according to one embodiment.

After the live action elements 251 are finished being filmed, the screen 254 and live action elements 251 are removed. A 360-degree stereoscopic still image of a background set may then be digitally photographed. As an example, FIG. 4 illustrates a background set 260 within which the live action elements 251 will be interactively composited by the home device. The live action elements 251 and screen 254 are removed, but are shown in stippled lines to illustrate where the live action elements 251 and screen 254 were filmed. The background set 260 includes building 262 and other items, such as a table 264, the moon 266, and a mail box 268. A set of cameras 270 are mounted on a sphere to enable a 360 degree stereoscopic digital photograph to be taken. The set of cameras 270 include the four cameras 256 that were used to film the live action elements 251. The four cameras 256 are used to each take a digital photograph of the background set 260 behind where the live action elements 251 will be later superimposed. The rest of the background set 260 is photographed by the remaining cameras from the set of cameras 270. Each of the remaining cameras includes one camera for the right eye and one camera for the left eye to have a stereoscopic image of the background set 260.

In the example described above in relation to FIG. 4, the live action elements 251 and screen 254 are removed, and the background set 260 behind which the live action elements will later be composited, is separately photographed by the same four cameras 256. The four cameras 256 have not been moved. The lighting and contrast ratios of the background set 260 and the unique nuances of individual lenses and cameras may therefore potentially exactly match the effect those lenses and cameras had on the image of the actors' 250/252 performances, because they are the same lenses on the same cameras on the same day in the same position with the same lighting. This means that the contrast, colour, exposure and other subtle pictorial elements of the actors' 250/252 recorded images may better match the still photographs of the background set 260, which may simplify the post-production work needed for producing convincing real time composites on the home device 108.

Alternatively, the background set 260 may be digitally photographed on a different day (or at a different time of day) from the recording of the live action elements 251 in FIG. 3, and in some embodiments the filming of the live action elements 251 in front of the screen 254 may occur in a studio.

Figure 5:
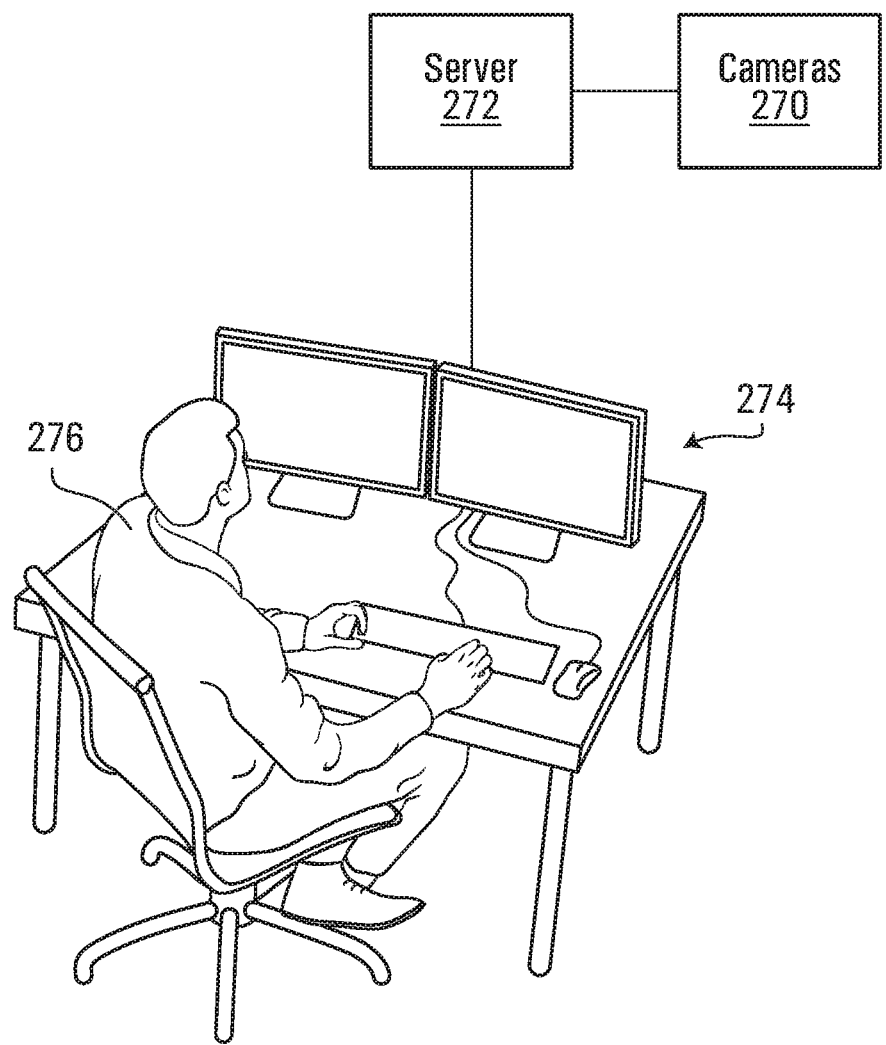
FIG. 5 illustrates an example setup for post-production editing, according to one embodiment.

With reference to FIG. 5, the stereoscopic video recording of the live action elements 251, and stereoscopic still digital image of the background set 260, is stored in memory on a server 272. Post-production may then be performed. For example, a computer 274 may be used by a member 276 of a post-production team to perform any desired editing and post-production activities.

Figure 6:
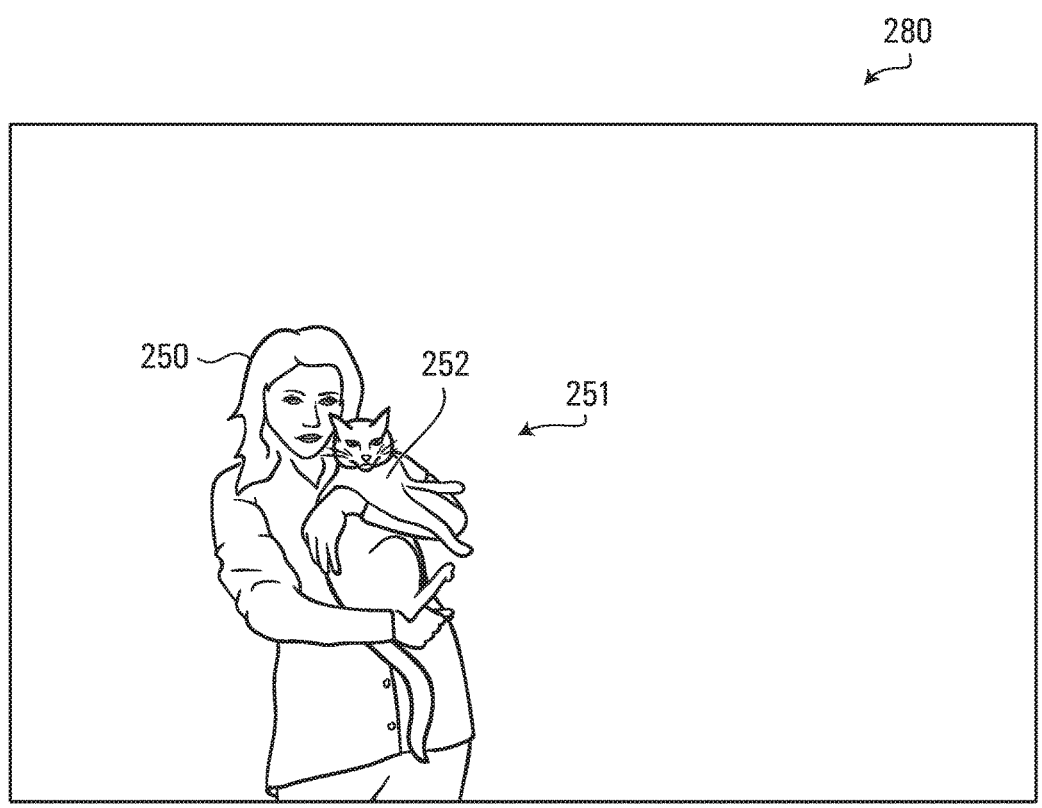
FIG. 6 illustrates an image of an alpha channel, according to one embodiment.

The video recording of the live action elements 251 forms an alpha channel that may be edited in a conventional fashion, e.g. by the member 276 of the post-production team. FIG. 6 illustrates an image of an alpha channel 280 corresponding to camera C of FIG. 3. Each one of the cameras 256 used to film the live action elements 251 would have its own alpha channel. There are four cameras 256 illustrated in FIG. 3, and so in this example there would be four alpha channels: one for each of cameras A to D (i.e. one for each filmed point of view). The alpha channel 280 of camera C comprises a series of images capturing the performance of the live action elements 251 as shot from camera C. The screen 254 is electronically removed from the alpha channel and the part of the frame that it occupied is left transparent.

However, post-production does not include compositing the stereoscopic video recording (the alpha channels) and the background digital still image 260. Instead of the stereoscopic video recording being "baked on" to the background digital still image during post-production, the stereoscopic video recording and the background digital still image are stored as separate files, so that they can be interactively composited by the home device 108 in real-time (e.g. on a frame-by-frame basis) based on the position of the viewer's head.

After post-production, the following is stored on server 272, as separate files, as the VR movie 104:

(1) The alpha channels of the live action elements 251. There would be one alpha channel for each camera used to film the live action elements 251.

(2) The 360 degree spherical digital still photograph of the background set 260.

(3) Instructions for the home device 108 to composite the alpha channels with the digital photograph of the background set 260, and (if necessary) instructions for the home device 108 to computer generate new picture elements, e.g. subtly moving clouds, a bird flying by, or a clock changing time, and composite these new picture elements together with the still image of the background set 260 in order to try to trick the eye into perceiving the still image to be a live action image. These instructions may be generated by the post-production team.

Returning to FIG. 1, the VR movie 104 is stored on the server 106 comprising (1) to (3) above. When the VR movie 104 is downloaded over the network 110 to the home device 108, (1) to (3) above is downloaded, which may be a smaller file size compared to if the whole VR movie was filmed in 360 degrees. Of course, in different scenes of the VR movie 104 there may be different background sets and/or live action elements. The FIG. 4 example may only be one segment of the VR movie 104.

Then, when the viewer 112 watches the VR movie 104, the home device 108 interactively interpolates the alpha channels into a stereoscopic image and then composites the alpha channels (live action elements) on top of the digitally photographed background set 260, and also composites computer generated picture elements as described in (3) above that may be used to try to trick the eye into believing that the still image background set 260 is a moving picture. The compositing is done in real-time, e.g. on a frame-by-frame basis based on the position of the viewer's head 116.

Figure 7:
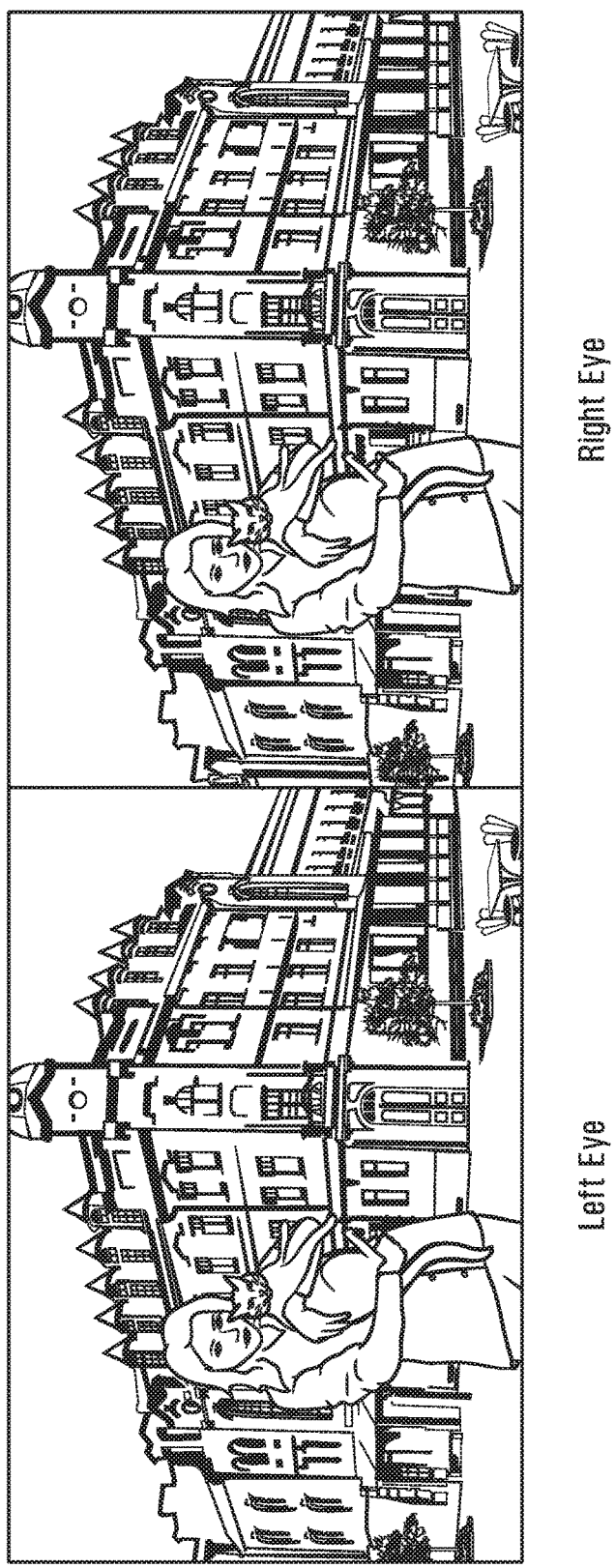
FIG. 7 illustrates a stereoscopic view of live action elements composited on top of a still image background, according to one embodiment.

When the viewer's head 116 is in its normal position, i.e. the viewer 112 is looking straight at the live action elements 251, the viewer 112 will see a stereoscopic view of the live action elements composited on top of the still image background 260, as shown in FIG. 7. The compositing is performed on the home device 108 to create the stereoscopic view. When the viewer 112 makes relatively small head movements around the live action elements 251, the processor 204 of the home device 108 will interpolate the alpha channel images from multiple ones of the cameras 256 in order to create a visual point-of-view to match what is to be seen by the viewer 112 based on the positional information from the head set 114. When the viewer 112 makes large movements of their head away from the live action elements 251, the viewer 112 will see the stereoscopic digital image of the background scene 260, with the processor 204 of the home device 108 possibly compositing computer-generated elements (e.g. blowing leaves) on top of the viewed portion of the background scene 260 for visual effects. For example, when the viewer 112 tilts their head 116 up, the viewer 112 will see the moon 266 (FIG. 4) of the still digital photograph of the background set 260, possibly with computer-generated clouds slowly passing over the moon 266, which are composited on top of the moon 266 by the home device 108. As another example, when the viewer 112 turns their head to the left and looks behind them, the viewer 112 will see the mailbox 268 of the still digital photograph of the background set 260, possibly with computer-generated leaves blowing around the mailbox 268, which are composited with the digital photograph of the background set 260 by the home device 108.

The four cameras 256 allow for interpolation of images of the live action elements by the home device 108 based on the position of the viewer's head 116, to match the viewer's new virtual point-of-view. This is performed by interpolating or "morphing" the image of one of the center cameras (cameras B or C of cameras 256) with one of the peripheral cameras (cameras A or D of cameras 256), and one center mounted camera image with the other center mounted camera image. Techniques for creating real time interactive point-of-view changes by interpolating the images of multiple cameras are known in the art, and are sometimes referred to as "Free Viewpoint Television" or FTV. As described above, the cameras 256 are placed relatively close together (e.g. inter-pupillary distance apart). This limits the amount of point-of-view adjustment to a few centimeters in each direction. A limited range is acceptable because when watching the movie it is expected that the seated viewer 112 may make many small head adjustments, but few to no large ones. This means that when the viewer 112 subtly shifts his or her head to the left or right, the viewer 112 will experience a realistic change of viewpoint, meaning see more of one side of a previously photographed object and less of the other side, in direct coordination with head movement, in addition to seeing more or less of the background. When the viewer 112 changes position in the z-axis by leaning forwards or back, the visual impression of close objects—whether photographed or computer generated—will also be adjusted accordingly by the home device 108. With computer-generated elements, this is straightforward. For pre-photographed elements, the needed changes may be made by combining shot size adjustment with small perspective changes made by interpolating image data from the four cameras 256. If the to-be-added background is a 4× photographed still image of set elements taken by the cameras 256 immediately after the actors' performances were shot, this background will be composited behind, or, if a foreground element, in front of the alpha channel image of the actors. With four alpha channel images of these photographed set pieces available for interpolation, the point-of-view and parallax relationship between foreground and background elements will also interact with viewer head movement, even though these elements are still images. This interactivity may enhance sense of reality of the person viewing the VR movie 104, thereby possibly improving the immersive quality of the experience. This technique allows the separation of the actors' performances into an alpha channel whether a scene is shot on location, in a built studio set or against a screen to be later interactively composited with a computer generated background. The above described use of four cameras to be interpolated into two interactive stereoscopic background images may be used whether a scene is shot on location or in a built studio.

As described above, more than two cameras 256 film the live action elements 251 and take a digital image of the background scene around the place at which the live action elements 251 will be composited. This allows for interpolation by the home device to create more subtle point-of-view changes around the focus of the movie: the live action elements 251. The rest of the 360 degree background scene may be photographed using other pairs of cameras: one for the left eye and one for the right eye to create a stereoscopic view. The use of more than two cameras, to have interpolation to allow for more subtle point-of-views, is not used for the rest of the 360 degree background scene because the background scene is in the distance.

In an alternative embodiment, the whole background set 260 of FIG. 4 may be computer generated using an algorithm executed by the processor 204 on the home device 208, so that a digital photograph of a real background set 260 does not even need to be taken. This may save cost by not having to construct a real physical background set. The live action elements 251 are instead composited on top of a computer generated background. If the background scene is computer generated, then item (2) of the VR movie 104 mentioned above may instead be a computer-generated background digital image, which may be in the form of instructions for the home device to computer-generate the background digital image. However, depending upon the nature of the background, it may be easier and/or less costly to construct and photograph a real physical set as the background, rather than computer generate the background. In some embodiments, the background may be a combination of computer generated picture elements and a digitally photographed real set.

In some embodiments, the alpha channel 280 linear stream of images (one for each of the cameras 256), plus the still image background, plus data pertaining to any visual effects needed (e.g. blowing leaves) may be separate sub-files, but packaged together in a single combined data file that constitutes the VR movie 104. The single combined data file may be streamed or downloaded over the network 110 onto the home device 108, or instead transferred to the home device 108 via a physical storage medium, such as a memory stick or disk. During the viewing of the VR movie 104, the headset 114 sends the positional information of the head 116 of the viewer 112 to home device 108. Based on the positional information from the headset 114, the processor 204 of the home device 108 interpolates alpha channel perspectives that it composites onto related still image 3D backgrounds, or device generated 3D backgrounds, or combinations thereof, and adds any required visual effects (e.g. blowing leaves). The composited stereoscopic image is then sent to the headset 114 via interfaces 210 and 220. The composited stereoscopic images are then displayed on the display 230 of the headset.

In the final composite, the alpha channel of the actors' images will occupy a fraction of the 360 degree spherical frame. When the viewer looks up, down, left, right or behind, most of what is seen will be a large stereoscopic photograph of the set, or a computer generated background, or a combination of both. Similar to a computer game, and as described above, the home device 108 may be tasked to apply visual effects, such as digital noise, camera flare, haze, birds in the distance, clouds, blowing leaves, buzzing flies etc., that try to trick the eye into believing that a still frame is a live action image.

In the method described above, it is not necessary to film the VR movie 104 in 360 degrees, or to use more than two cameras for all portions of the 360 degree spherical frame. Instead, the live action elements are filmed, using four or more cameras 256, as a stream of stereoscopic rectangular images to create a stereoscopic video recording that allows for interpolation of images of multiple ones of the cameras 256. The rest of the 360 degree background is separately digitally photographed using pairs of cameras for stereoscopic viewing, and/or computer-generated in 360 degrees. The live action elements and the background are then stored as separate files and downloaded onto the home device, and compositing is performed in real time in the home device. The separation and differential treatment of the live action elements and the background may allow for an approximately 99% reduction in data file size without losing quality, compared to recording a live action stream of 360 degree images. For example, the file size may be 10 to 20 gigabytes instead of 1 terabyte for a 100 minute VR movie. Reducing the file size of the VR movie 104 using the techniques described herein may allow for a high resolution picture quality to be maintained, while still having a more desirable file size. This may be beneficial compared to instead using compression techniques to reduce the file size because the separation and differential treatment of the live action elements and the background allows the post-production team to make shot-by-shot decisions related to image resolution that may result in a higher quality viewer experience. Of course, compression could still be applied to any of the embodiments described herein to even further reduce the file size (or reduce the file size of some scenes to allow for greater resolution in other scenes), but such compression may not be needed, or may not be needed as much.

In the future, when home download speeds are presumably much faster than today, the ability to reduce file size by compositing alpha channels of live action elements with separately streamed backgrounds may not be needed for high resolution live action VR movie viewing. However, the ability to interpolate multiple cameras (cameras 256) to mimic real life stereoscopic point-of-view changes around the live action elements, that are interactive with head movement, will continue to benefit the live action VR experience. Live action VR systems that use the multiple cameras 256 mounted on a horizontal axis may feel more real and immersive than live action VR systems that do not have interactive horizontal-axis point-of-view changes. The foreground is not "baked" onto the background during post-production. Instead, interactive compositing is performed in real-time by the home device 108, and due to the filming using the cameras 256, the home device 108 may be able to replicate the subtle but important point-of-view changes a viewer experiences when observing the live action elements in real life. The home device 108 may interactively mimic the changing point-of-view that occurs when the viewer 112 repositions his head 116, even slightly. The viewer 112 may in effect be able to look around the pre-recorded live action elements 251, creating a visual experience that may significantly enhance the 'reality' of live action visual reality.

In some embodiments, additional editing may be performed in order to further reduce the file size of the VR movie 104 that is downloaded or streamed over the network 110. For example, and with reference to FIG. 3, if in some scenes the cameras 256 are located at a greater distance from the live action elements 251 (e.g. the human 250 and cat 252 move farther away from the cameras 256), then the edit that goes to the home device 108 in those scenes may include just the two center alpha channels: one point-of-view for the left eye and another for the right eye, on the assumption that the cameras 256 are too far away from the live action elements 251 for a small point-of-view change to register, and so interpolation by the home device is not needed in those scenes. That is, only the images from cameras B and C may be used in such scenes. To reduce data further, if the live action elements 251 are very far away from the cameras 256, and only tiny in the frame, and the two alpha channel images are for all practical purposes identical, then the edit of the alpha channel images may be reduced to one channel, which would be identically composited for each eye. Only if the live action elements 251 are positioned close to cameras 256, then all four alpha channels (one for each of the four cameras 256) will be received by the home device 108. The center right and center left cameras (cameras B and C) will represent what the right and left eyes normally see. Alpha channel images from the right peripheral camera and left peripheral camera (cameras A and D) will be utilized to interpolate images of what the right and left eyes see when the viewer moves his or her head to the left or right.

In an alternative embodiment, the VR movie 104 may have little to no live action set due to cost or other factors. The alpha channel may instead be an edited image of a real object (e.g. real person or real animal), that is then composited on top of a computer-generated background by the home device 108.

Finally, the embodiments described above imply a locked-in-place camera, or no camera movement relative to the set, which means the cameras 256 may be fixed in place in a studio or mounted inside a moving car, or fixed in place on the deck of a ship, where the set does not move relative to the camera, but the background does. However, if camera movement is desired, the camera moves may be recorded using motion control, visual reference points, or another technique, so that the relative position of the computer generated set can be matched when later composited with the alpha channel by the home device 108.

Figure 8:
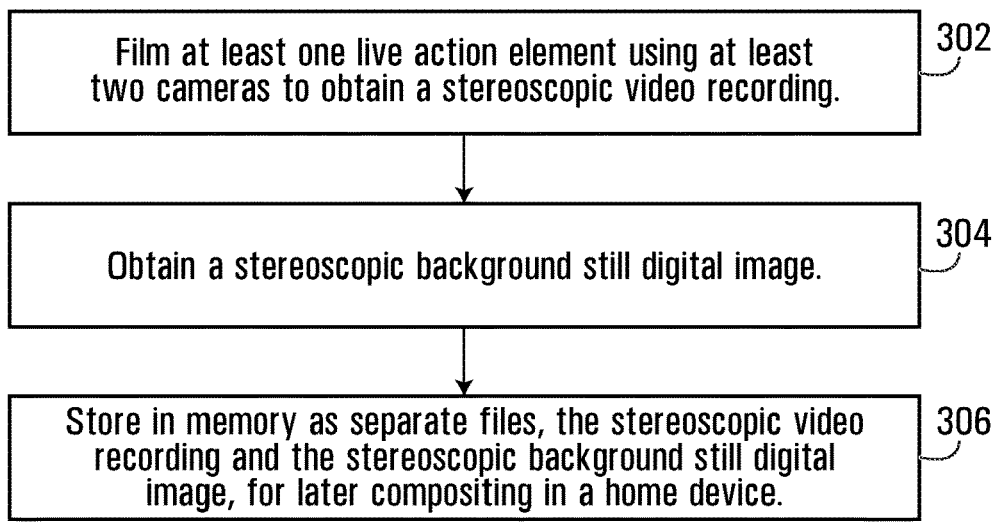
FIG. 8 is a flowchart of a method of obtaining a VR movie, according to one embodiment.

FIG. 8 is a flowchart of a method for obtaining a VR movie, according to one embodiment. In step 302, at least one live action element is filmed using at least two cameras to obtain a stereoscopic video recording. In step 304, a stereoscopic digital still image of the background is separately obtained. The stereoscopic digital still image of the background may be a digitally photographed still image of the background, or a computer-generated digital still image of the background. A computer-generated stereoscopic digital still image of the background may be in the form of a set of instructions for computer-generating the stereoscopic digital still image of the background.

In step 306, the stereoscopic video recording and the stereoscopic digital still image of the background are stored in memory, as separate files, for later compositing in a home device.

In some embodiments, the method further comprises assembling files to be used by the home device to computer generate picture elements that enhance the stereoscopic digital still image of the background. The assembled files may be stored in the memory, along with instructions for the home device to computer-generate the picture elements to be composited onto the digital still image of the background.

In some embodiments, the stereoscopic digital still image of the background is a panoramic still image, such as a 360 degree spherical still image, to be composited in the home device with at least the stereoscopic video recording (and possibly also computer-generated visual effects). However, a 360 degree background spherical still digital image is not necessary, e.g. if the viewer does not have the ability to look in a particular direction (e.g. behind them).

In some embodiments, the at least two cameras comprise a first camera and a second camera (e.g. camera B and C in FIG. 3). The first camera corresponds to a left eye, and the second camera corresponds to a right eye. The first camera may be separated from the second camera by an inter-pupillary distance. In some embodiments, there may be at least four adjacent cameras. Each one of the four adjacent cameras films the at least one live action element. A video recording from each one of the four adjacent cameras is stored in memory, so that an image from one of the four adjacent cameras can be interpolated with an image from another one of the four adjacent cameras by the home device. The four adjacent cameras may be mounted horizontally in parallel or on a horizontal curve of a sphere. Other configurations are possible, e.g. the four or more adjacent cameras may be positioned in a rectangle or square. In some embodiments, at least the middle two cameras of the four adjacent cameras are spaced by an inter-pupillary distance from each other.

In some embodiments, obtaining the stereoscopic digital still image of the background comprises digitally photographing a real physical movie set. For example, the at least two cameras may be used to digitally photograph a location in the real physical movie set at which the stereoscopic video recording is to be composited with the stereoscopic digital still image of the background. The filming the at least one live action element may comprise filming the at least one live action element in front of a screen on the premises of the real physical movie set. Obtaining the stereoscopic digital still image of the background may include removing the at least one live action element and the screen, and then digitally photographing the real physical movie set.

Figure 9:
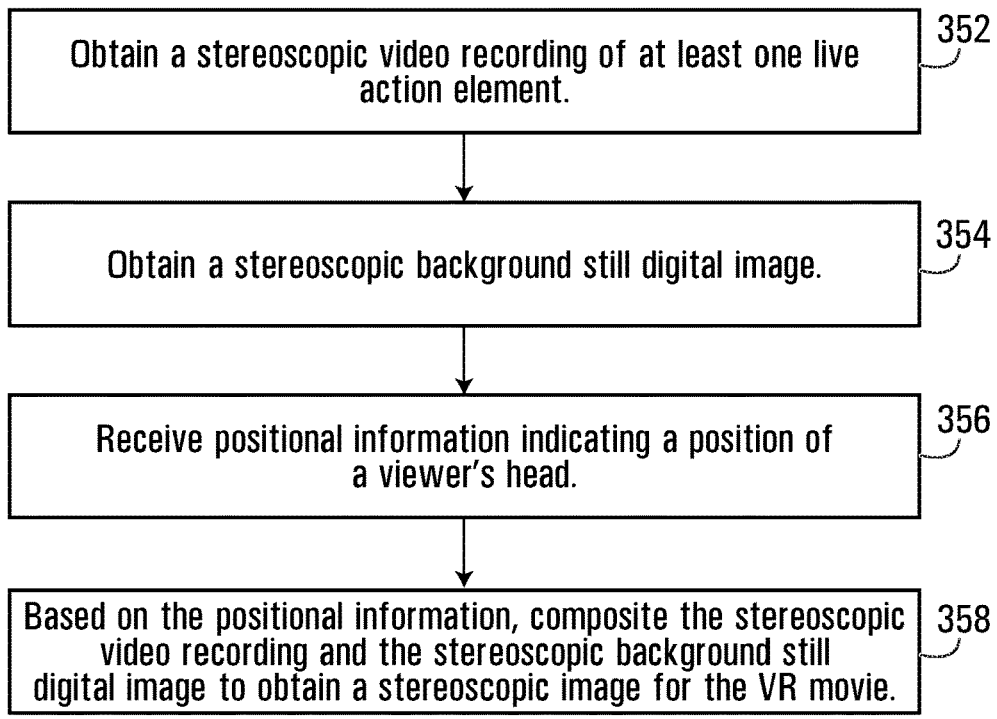
FIG. 9 is a flowchart of a method for generating a VR movie, according to one embodiment.

FIG. 9 is a flowchart of a method for generating a VR movie, according to one embodiment. The method is performed by a home device. In step 352, the home device obtains a stereoscopic video recording of at least one live action element. The video recording may be in the form of more than two alpha channels (one alpha channel for each filming camera). In step 354, the home device obtains a stereoscopic digital still image of the background. For example, the home device receives the stereoscopic video recording and the stereoscopic digital still image of the background as two separate files, e.g. downloaded or streamed over a network. In step 356, the home device receives positional information indicating a position of a viewer's head. In step 358, based on the positional information (e.g. received from a head set), the home device composites the stereoscopic video recording and the stereoscopic digital still image of the background to obtain a stereoscopic image for the VR movie. In one embodiment, the method further comprises the home device also obtaining instructions to computer-generate picture elements to be composited onto the stereoscopic digital still image of the background. The instructions may be downloaded with the stereoscopic video recording and the stereoscopic digital still image of the background. The computer-generated picture elements are to enhance the digital still image of the background.

In one embodiment, a method comprises storing in memory a stereoscopic video recording of at least one live action element that was filmed using at least two cameras, and a stereoscopic digital still image of the background. The stereoscopic video recording and the stereoscopic digital still image of the background are stored as separate files for later compositing in a home device. A memory is also disclosed that stores the stereoscopic video recording, the stereoscopic digital still image of the background, and instructions for the home device to composite the stereoscopic video recording and the stereoscopic digital still image of the background together (e.g. in real time, such as on frame-by-frame basis) based on the position of the viewer's head.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method for obtaining a virtual reality (VR) movie, comprising:
 filming at least one live action element using at least two cameras to obtain a stereoscopic video recording;
 obtaining a stereoscopic digital still image of a background separate from the at least one live action element;

storing in memory, as separate files, the stereoscopic video recording and the stereoscopic digital still image of the background, for later compositing in a home device;

wherein the at least two cameras comprise at least four adjacent cameras; wherein each one of the four adjacent cameras films the at least one live action element; and wherein a video recording from each one of the four adjacent cameras is stored in memory, so that an image from one of the four adjacent cameras can be interpolated with an image from another one of the four adjacent cameras by the home device.

2. The method of claim 1, wherein the stereoscopic digital still image of the background is a 360 degree spherical still image to be composited in the home device with at least the stereoscopic video recording.

3. The method of claim 1, wherein the at least two cameras comprise a first camera and a second camera; the first camera corresponding to a left eye, and the second camera corresponding to a right eye, and the first camera separated from the second camera by an inter-pupillary distance.

4. The method of claim 1, wherein the four adjacent cameras are mounted horizontally in parallel or on a horizontal curve of a sphere.

5. The method of claim 4, wherein at least the middle two cameras of the four adjacent cameras are spaced by an inter-pupillary distance from each other.

6. The method of claim 1, wherein obtaining the stereoscopic digital still image of the background comprises:
using a computer to computer-generate the stereoscopic digital still image of the background.

7. A method for obtaining a virtual reality (VR) movie, comprising:
filming at least one live action element using at least two cameras to obtain a stereoscopic video recording;
obtaining a stereoscopic digital still image of a background separate from the at least one live action element;
storing in memory, as separate files, the stereoscopic video recording and the stereoscopic digital still image of the background, for later compositing in a home device;
wherein obtaining the stereoscopic digital still image of the background comprises digitally photographing a real physical movie set;
the method further comprising using the at least two cameras to digitally photograph a location in the real physical movie set at which the stereoscopic video recording is to be composited with the stereoscopic digital still image of the background;
wherein filming the at least one live action element comprises filming the at least one live action element in front of a screen on the premises of the real physical movie set; and wherein obtaining the stereoscopic digital still image of the background comprises: removing the at least one live action element and the screen, and then digitally photographing the real physical movie set.

8. A system for obtaining a virtual reality (VR) movie, comprising:
at least two cameras to film at least one live action element and thereby obtain a stereoscopic video recording;
a set of cameras to digitally photograph a background to obtain a stereoscopic digital still image of the background, or a computer to computer-generate the stereoscopic digital still image of the background;
memory to store, as separate files, the stereoscopic video recording and the stereoscopic digital still image of the background, for later compositing in a home device;
wherein the at least two cameras comprise at least four adjacent cameras; wherein each one of the four adjacent cameras is to film the at least one live action element; and wherein the memory is to store a video recording from each one of the four adjacent cameras, so that an image from one of the four adjacent cameras can be interpolated with an image from another one of the four adjacent cameras by the home device.

9. The system of claim 8, wherein the stereoscopic digital still image of the background is a 360 degree spherical still image to be composited in the home device with at least the stereoscopic video recording.

10. The system of claim 8, wherein the at least two cameras comprise a first camera and a second camera; the first camera corresponding to a left eye, and the second camera corresponding to a right eye, and the first camera separated from the second camera by an inter-pupillary distance.

11. The system of claim 8, wherein the four adjacent cameras are mounted horizontally in parallel or on a horizontal curve of a sphere.

12. The system of claim 11, wherein at least the middle two cameras of the four adjacent cameras are spaced by an inter-pupillary distance from each other.

13. The system of claim 8, wherein the computer is to computer-generate the stereoscopic digital still image of the background.

14. A system for obtaining a virtual reality (VR) movie, comprising:
at least two cameras to film at least one live action element and thereby obtain a stereoscopic video recording;
a set of cameras to digitally photograph a background to obtain a stereoscopic digital still image of the background, or a computer to computer-generate the stereoscopic digital still image of the background;
memory to store, as separate files, the stereoscopic video recording and the stereoscopic digital still image of the background, for later compositing in a home device;
the system further comprising a real physical movie set, and wherein the set of cameras are to digitally photograph the real physical movie set in order to obtain the stereoscopic digital still image of the background;
wherein the at least two cameras are to digitally photograph a location in the real physical movie set at which the stereoscopic video recording is to be composited with the stereoscopic digital still image of the background;
further comprising a removable screen placed on the premises of the real physical movie set; and
wherein the at least two cameras are positioned to film the at least one live action element in front of the screen.

* * * * *